US009154737B2

(12) United States Patent
Thomas (10) Patent No.: US 9,154,737 B2
(45) Date of Patent: Oct. 6, 2015

(54) USER-DEFINED CONTENT MAGNIFICATION AND MULTI-POINT VIDEO CONFERENCE SYSTEM, METHOD AND LOGIC

(71) Applicant: CISCO TECHNOLOGY, INC., San Jose, CA (US)

(72) Inventor: Paul Bright Thomas, Langley (GB)

(73) Assignee: Cisco Technology, Inc., San Jose, CA (US)

( * ) Notice: Subject to any disclaimer, the term of this patent is extended or adjusted under 35 U.S.C. 154(b) by 412 days.

(21) Appl. No.: 13/667,971

(22) Filed: Nov. 2, 2012

(65) Prior Publication Data

US 2014/0125755 A1    May 8, 2014

(51) Int. Cl.
*H04N 7/14* (2006.01)
*H04N 7/15* (2006.01)
*H04L 29/06* (2006.01)

(52) U.S. Cl.
CPC .............. *H04N 7/152* (2013.01); *H04L 65/403* (2013.01); *H04L 65/604* (2013.01)

(58) Field of Classification Search
CPC ................................ H04M 2203/50–2203/509
USPC .................... 348/14.01–14.16; 370/259–271, 370/351–357; 379/67.1–88.28, 201.01, 379/202.01–207.01, 265.01–266.1; 709/201–207, 217–248
See application file for complete search history.

(56) References Cited

U.S. PATENT DOCUMENTS

| | | | |
|---|---|---|---|
| 6,449,639 B1 * | 9/2002 | Blumberg | 709/217 |
| 8,139,100 B2 * | 3/2012 | King et al. | 348/14.09 |
| 2004/0008249 A1 * | 1/2004 | Nelson et al. | 348/14.09 |
| 2004/0236830 A1 * | 11/2004 | Nelson et al. | 709/204 |
| 2005/0108661 A1 * | 5/2005 | Deeds | 715/865 |
| 2006/0164508 A1 * | 7/2006 | Eshkoli et al. | 348/14.09 |
| 2007/0150829 A1 * | 6/2007 | Eschbach et al. | 715/781 |
| 2008/0092172 A1 * | 4/2008 | Guo et al. | 725/47 |
| 2008/0222273 A1 * | 9/2008 | Lakshmanan et al. | 709/219 |

* cited by examiner

*Primary Examiner* — Hemant Patel
(74) *Attorney, Agent, or Firm* — Lempia Summerfield Katz LLC (57) ABSTRACT

A method, system and logic cooperate to display presentation content as a presentation content portion of an image displayed at a videoconference endpoint. The presentation content includes at least one of text and graphics. A videoconference endpoint sends an electronic request to a multi-point control unit, MCU, to increase a scale of the presentation content portion of the image displayed at the videoconference endpoint. The MCU changes an encoding of the presentation content to increase the scale of the presentation content portion of the image. The MCU then sends the enhanced presentation stream, which includes the presentation content portion having an increased scale of the image, to the videoconferencing endpoint. A purpose of changing the scale is to improve legibility of content that may be contributed at, and view by others at, a resolution superior to that received by the endpoint requesting the modification of the presentation content.

19 Claims, 8 Drawing Sheets

USER-DEFINED CONTENT MAGNIFICATION AND MULTI-POINT VIDEO CONFERENCE SYSTEM, METHOD AND LOGIC

BACKGROUND

1. Field of the Disclosure

The present disclosure relates to the systems, methods, and logic for allowing user-defined content magnification of content in video conferences.

2. Description of the Related Art

A video conference system allows endpoints at two or more locations to communicate simultaneously by two-way video and audio transmission. Typically, powerful computer processors are used to employ video compression to reduce the amount of channel bits needed to be transmitted between endpoints. Simultaneous video conferencing among three or more remote points is made possible by way of a multi-point control unit (MCU), which bridges interconnect calls from several sources. There are both switch based MCUs that switch communications between devices, and transcoding MCUs, which have the ability to change data rates, resolutions and encoding formats to support the capabilities of different endpoints, which often have varying capabilities with regard to display resolution, and supporting bandwidth through the communication lines. By using a transcoding MCU, every participants' data stream is decoded and every participant receives a unique encoded media stream.

An auxiliary video stream may also be transmitted that carries presentation material (perhaps presentation slides) to supplement the person-to-person video conferencing. Typically, the presentation material is encoded and sent to each of the participants.

DETAILED DESCRIPTION

Among other things, a method is described that includes displaying presentation content as a presentation content portion of an image displayed at a videoconference endpoint. The presentation content includes at least one of text and graphics. The method includes sending an electronic request from the videoconference endpoint to a multi-point control unit, MCU, to increase a scale of part of the presentation content portion of the image displayed at the videoconference endpoint. The MCU changes an encoding of the presentation content to increase the scale (or proportion) of part of the presentation content portion of the image. The MCU sends the enhanced presentation stream, which includes the presentation content portion having an increased scale of the image, to the videoconferencing endpoint. When employed this way, the system allows the endpoint user to select portions of the presentation content to be "magnified" for ease of readability/viewability, which is especially important for endpoints with low display resolution relative to the resolution at which the presentation is contributed to the conference, or which are receiving a lower resolution than they are capable of displaying due to a down-rating of the transmitted bandwidth to minimize the effect of network loss.

Figure 1:
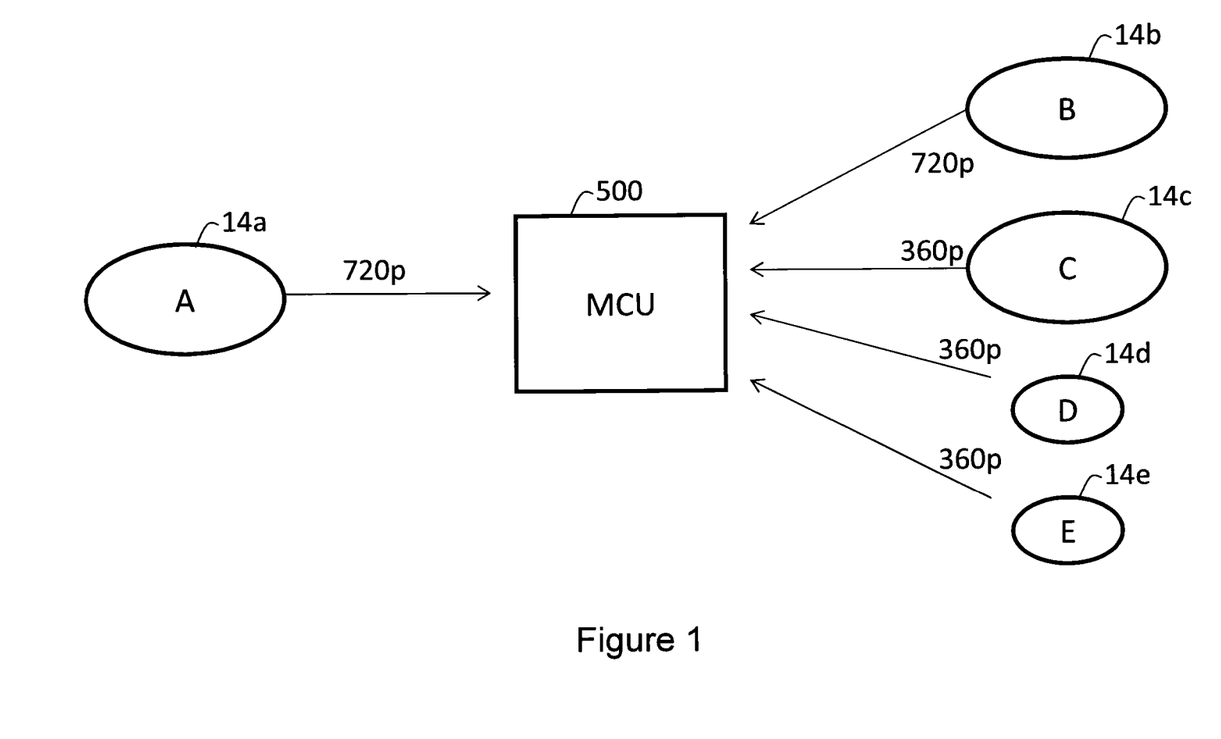
FIG. 1 is a block diagram of a multi-point video conference system, using a transcoding MCU, showing the video contributed by each endpoint, so that conference participants using that endpoint can be seen in the conference.

FIG. 1 is a block diagram of a multi-point video conference system that is shown to support five different endpoints. A multi-point control unit (MCU) 500 is a transcoding MCU, that receives video content from each of five endpoints A-E, respectively assigned reference numerals 14a, 14b, 14c, 14d and 14e. Each of the endpoints 14a-14e provides a video feed at a particular resolution to the MCU 500. For example, endpoint A 14a provides a video stream at 720p resolution (i.e., a picture height of 720 rows of pixels) to the MCU 500. Another endpoint, endpoint E 14e, provides a video stream at a lower resolution, 360p to the MCU 500. Structural features of the endpoints and the MCU 500 is discussed in more detail later with regard to FIGS. 7 and 8 respectively.

Figure 2:
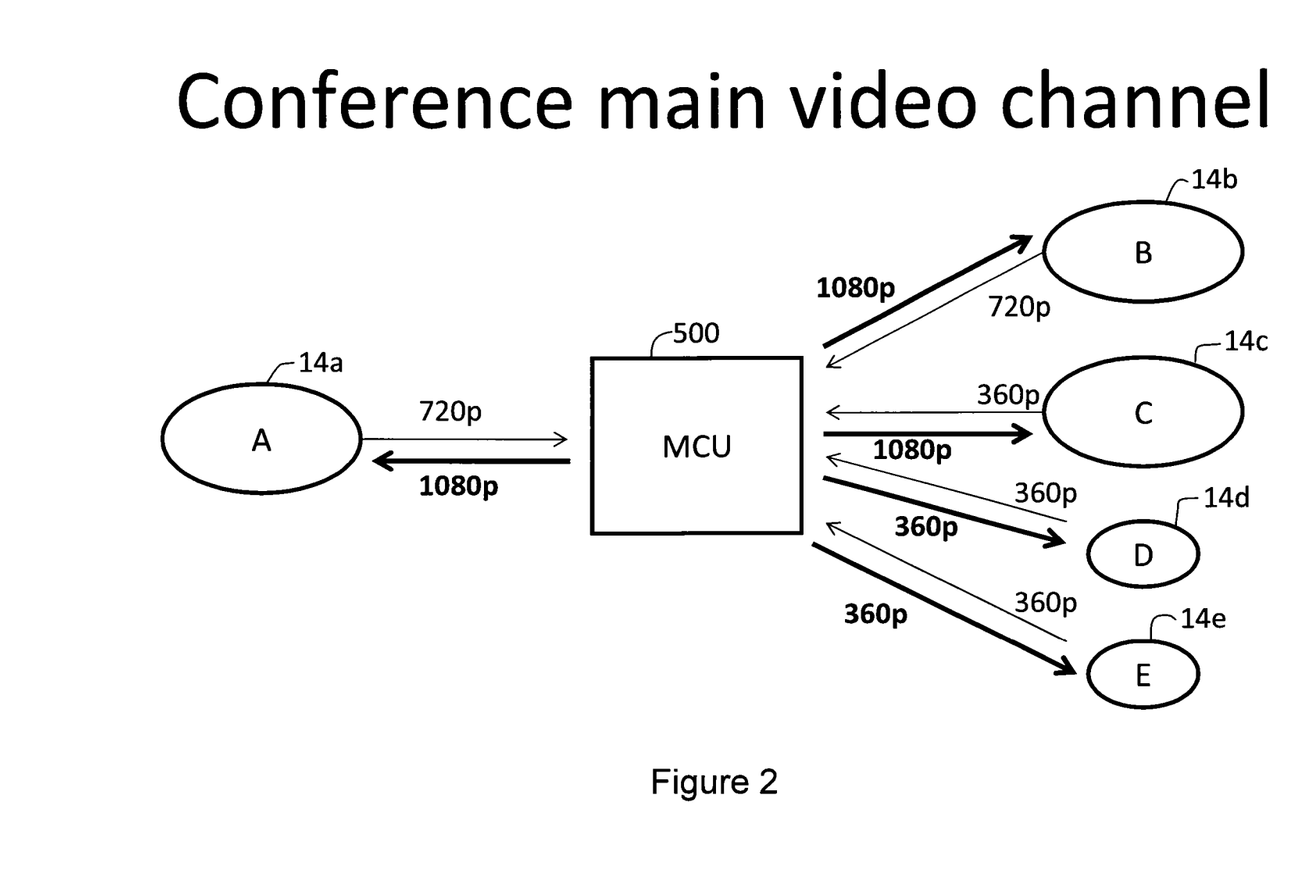
FIG. 2 is a block diagram of the system of FIG. 1, that also includes the data flow for a conference main video channel.

FIG. 2 is a block diagram of the system shown in FIG. 1, but also includes the conference main video channel provided from the MCU 500 to the respective endpoints 14a-14e. This main video channel is represented as labeled arrows pointing to the endpoints 14a-14e. In recognition of the differing bandwidth and processing capabilities of the respective endpoints, the MCU 500 sends a uniquely coded video stream, customized to its resolution and capabilities, and providing an endpoint-specific view of the conference. For example, the MCU 500 sends to the endpoint A 14a, a 1080p conference main video stream, referred to as a conference main video channel. However, endpoints D and E (14d, 14e) have a lesser capability and/or lesser bandwidth availability and cannot support a 1080p conference main video channel. Accordingly the MCU 500 reduces the resolution to the endpoints D and E (14d, 14e) to 360p. On the other hand, endpoints B and C (14b, 14c) are able to also handle higher resolution video streams and therefore can support a 1080p conference main video channel, as shown.

Figure 3:
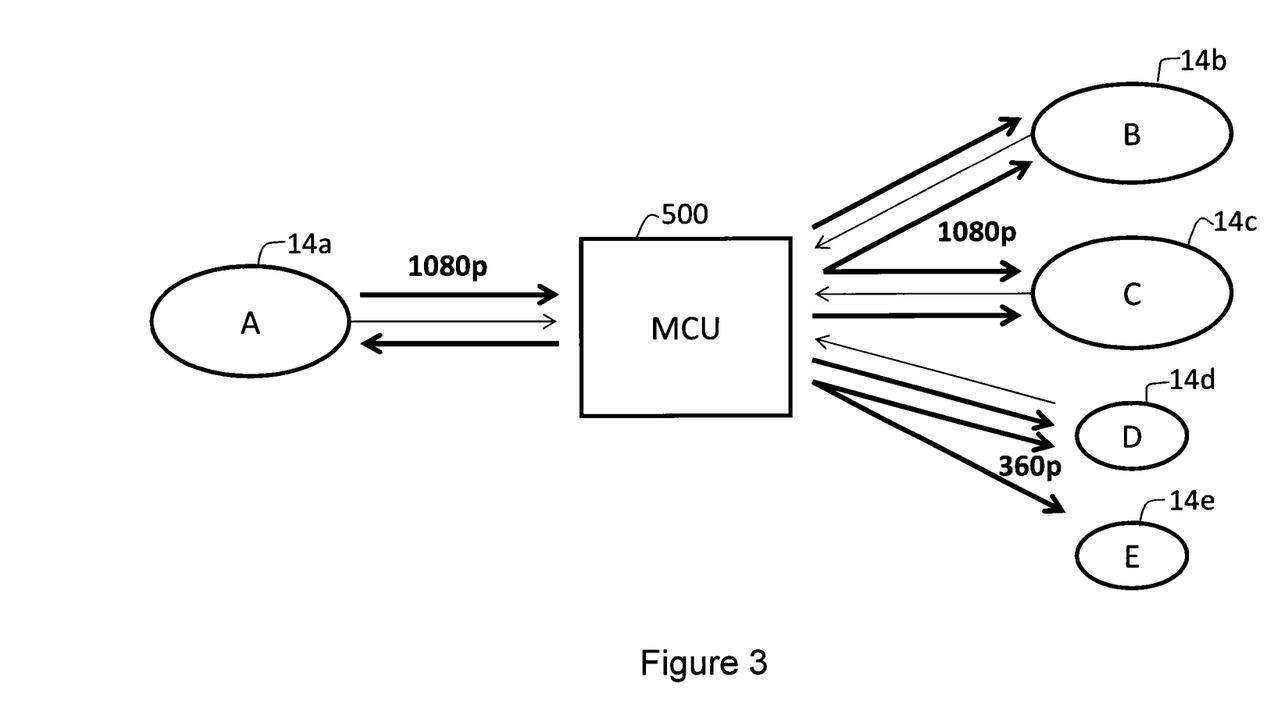
FIG. 3 is the block diagram of the system of FIG. 1, that further includes a conference content channel sent by endpoint A to the MCU, where it is transcoded for streams of differing resolutions to be sent to different endpoints;"

FIG. 3 is another block diagram of the video conference system of FIG. 1, but in this case, endpoint A 14a provides presentation content to the MCU 500. The MCU 500 transcodes the presentation content into a conference content channel at several resolutions and simulcasts the conference content channel to multiple participants at a common resolution. The common resolution for endpoints B and C (14b, 14c) is 1080p, while the common resolution for endpoints D and E (14d, 14e) is 360p. Some endpoints, such as endpoint D 14d, are able to receive both the conference main video channel as well as the conference content channel, as shown. However, other endpoints, such as endpoint E 14e, can only receive a single channel, and so when the MCU 500 sends the conference content channel to endpoint E 14e, endpoint E 14e receives only the content channel when the content is being presented. In this situation, a user at endpoint E 14e may only see text, for example, from a presentation material, and not any of the conference participants' video images.

Figure 4:
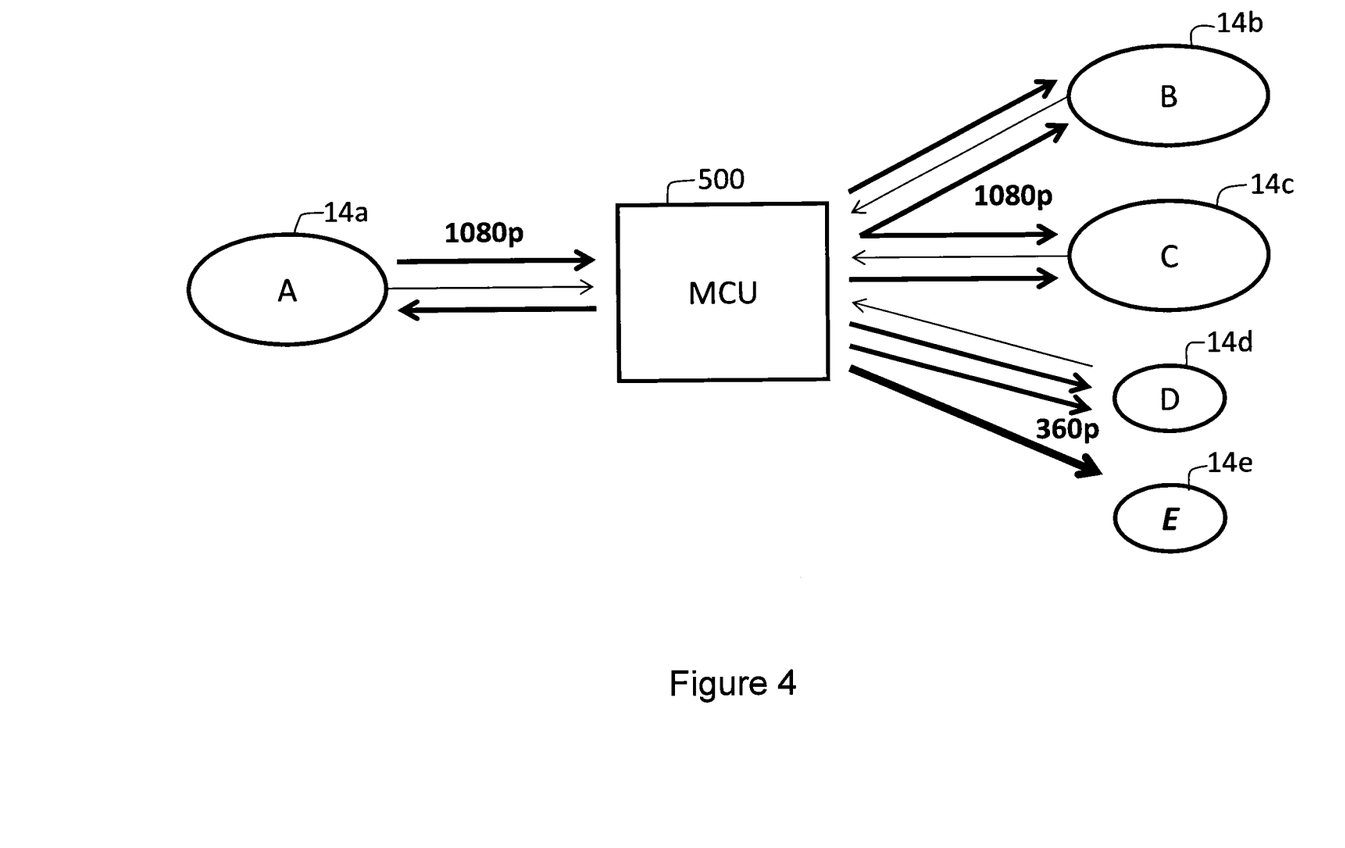
FIG. 4 is a block diagram of the system of FIG. 1, that further includes an enhanced conference content produced by the MCU and transmitted to endpoint E.

FIG. 4 is similar to FIG. 3, however the MCU 500 includes the conference content in the main video channel to the endpoint E 14e, which is made possible by the MCU 500 providing per-participant encoding. The per-participant encoding performed by the MCU 500 uses additional processing resources, but no more than if endpoint E 14e were a dual-channel endpoint. In this context, endpoint E 14e is able to receive both video and presentation content (such as POWERPOINT slides) in the single enhanced conference content channel made possible by the MCU 500.

As recognized by the present inventor, an endpoint, such as endpoint E 14e may have a small screen with limited resolution and/or a connection to the MCU 500 with limited bandwidth, which in turn makes the content image presented to the end-user difficult to read. Moreover, the relatively low resolution capability of the endpoint E 14e having a portion of a display screen dedicated to the presentation of non-video content, along with video in other portions of the display, makes the presentation of the text of relatively poor quality and therefore difficult to read. In light of this observation, the present inventor recognized that the user may select and request to the MCU to provide content magnification, a type of digital zoom implemented at the MCU, to a particular region of the endpoint 14e's display so that the content is easier to view by the user.

Allowing an endpoint to request that the MCU rescale a part of the video stream containing particular content (such as text or graphics) improves viewability/readability of the content at the endpoint. The MCU has the processing infrastructure to allow for the rescaling, and thus provides an automatically retrofitted ability to support all endpoints simply by responding to a request from the endpoint. Moreover, it is not merely an enlarging of the image, but a modification to the source video provided to the endpoint that provides magnification to improve readability. It should be noted that not only is the MCU rescaling the image to provide a larger amount of real estate on the display screen to be dedicated to the content, but also has the ability to apply a more computationally extensive data adaptive scaling algorithm to improve resolution at the endpoint. Moreover, scaling before encoding is likely to be visually superior to scaling after decoding at the endpoint.

The present inventor also recognized several advantages of the proposed approach for providing the user-defined content magnification at the endpoint. First, by performing magnification prior to the encoding process in the MCU, a higher proportion of the encoded bitstream is spent on the magnified region than if it was sent unmagnified, to be magnified at the destination endpoint. Additional information about that text area has been encoded and sent, and this is likely to be a superior representation of the text than an encoding made at the original scale, and magnified at the destination. Also, the MCU generally has a more powerful upscaling algorithm and processing resources than are available at the endpoint. Accordingly, a more powerful upscaling algorithm may be used at the MCU to improve quality.

Because the MCU is a transcoding MCU and performs the content magnification, all endpoints may benefit from the MCU performing this function, regardless of the processing capabilities at the endpoints. Moreover, the MCU is the one that modifies the video stream, based on encoding so that the endpoint merely has to display the content that is sent to it, rather than choosing which content to present and what upscaling algorithm to perform.

Various options are available for the user to determine what portion of the content the user requests to be magnified. In one embodiment, this magnification is done through a menu-based system that allows preselected areas of the endpoint's display screen to be identified for enhancement (as will be discussed with regard to FIG. 6). Furthermore, by restricting the definition of the magnified region to one of a set of discrete portions of the presentation content, choices of content magnification are limited to none, or one of the specified set, and magnified content streams may be shared amongst participants at the same resolution, giving independent choice of magnification from a set of non-unique streams, thus saving encoding effort in a conference of many participants. Alternatively, if the conservation of encoding resource is not a primary concern, or if the freedom of the user to specify an arbitrary enhancement region is important, the user may use a pointing device such as a mouse, or a touch screen display for identifying an area to be magnified, and then indicating an amount by which that magnification could be performed.

Fewer options for defining the scaled region may be beneficial in terms of resource management than completely freely-defined enhancement regions (which might itself be a superior experience, and in-line for the expectation of when graphical content is modified locally). Since the generation of enhanced (magnified) content means moving the endpoint requesting the enhancement from a shared encode to a customized encode, on which processing resources must be expended, the greater diversity that is possible in specifying the enhancement, the greater the number of new customized encodes could be required. Where the enhancement can only be specified from a discrete set of choices, there is a limit on the number of content encodes that could be needed within the conference; with the menu-based specification, even in a conference of 100 endpoints, the enhancement choices are limited to 10, namely positions 0-8, or not at all.

In any event, by coordination between a transcoding MCU and an endpoint that specifies what portion of the content the MCU is to magnify, allows for the user to define the content to be magnified for improved viewability of content by the user.

As previously discussed, the MCU 500 performs a transcoding operation, which has the ability to adjust the resolution of the image and content to be sent to the various endpoints, based on the resolution and bandwidth supported by that particular endpoint. In this situation, as previously discussed with regard to FIG. 3, where endpoint E 14e is only able to view one of (a) the main video stream or (b) the conference content channel, the endpoint must choose between the auxiliary stream or the main video stream, which includes the human interactions. However, as was discussed with regard to FIG. 4, the MCU can include the presentation content material in the main video stream to be uniquely presented to that particular endpoint (endpoint E 14e). Moreover, if the user opts to select this option (by selecting a predetermined option from a pull-down menu at the endpoint) the MCU recognizes this request and includes the presentation content with the video, by mixing the video with the content onto a commonly shared main video stream. Thus, a custom-made main video stream with presentation content material included therein is made available for that user of the endpoint. This modification to the main video content is performed by scaling the main video, so the content can be inserted in a portion no longer occupied by the video image (or overlaid on the video image). In this way, multiple streams may be brought together, positioned side-by-side or even overlaid one on top of the other. Furthermore, because the MCU is performing the mixing, both text and graphics may be overlaid on the video image to enhance its usability to the end-user. This way, frames of video are passed through a video encoder and are processed normally, while modification objects performed at the MCU upstream of the final encode are executed to produce the text and graphics in a magnified format. By applying the encoder process for a particular mixed stream to an endpoint, the magnification requested by the user at that endpoint is configured according to what the end-user requested.

The route by which the user would make the request at the endpoint is from the endpoint to the MCU via, for example, dual-tone multi-frequency signaling (DTMF) that may be received at the MCU by an application processor that configures a digital signal processor(s) (as a magnifier processing object) to magnify the selected content with a predetermined scale factor such as 150%. The next time the user changes the request, a new command may come from the application processor to the magnifier processing object, requesting a magnification for a different region, or to stop the magnification request.

The MCU includes both the content and the video, in the form of video frames that are transmitted in series. Each frame of video essentially is a picture and a portion of the picture is removed and the content is inserted as a patch of magnified video in the portion of the video that has been removed. This patch of magnified video is superimposed on the portion of the video frame that would then be presented at the endpoint.

As an alternative, the enhancement need not be specified by the endpoint user, but may be centrally-specified, such that a conference chairperson (a third party between presenter and viewer), who may wish to draw attention to one aspect of the presentation content. The enhancement would then be specified for all, and could be applied in the shared content encode (for a particular resolution where enhancement is necessary), rather than in a customised encode for one (or a set of) viewers requiring a specific enhancement. The presenter of content (rather than third party chair) may also need this functionality if they are not able to magnify the content at source.

The enhancement may also be applied not just to presentation content material, but for enhancement of main video content in order to see something that would otherwise be difficult to resolve. One example is when an endpoint is used to allow a large auditorium of people to join a meeting; such as when one of the audience members becomes a speaker, the room will be shown to all in the conference, but it might be impossible to see who is speaking without magnifying part of the main video stream. Cameras within the room might be able to achieve this, but in some cases, far-end camera positioning/zooming might be limited or unavailable and in any case is difficult to use, since positioning is non-discrete and tends to overshoot with network delay of control actions. Allowing the enhancement to be content other than presentation content, in this embodiment, resolves this dilemma.

Figure 5:
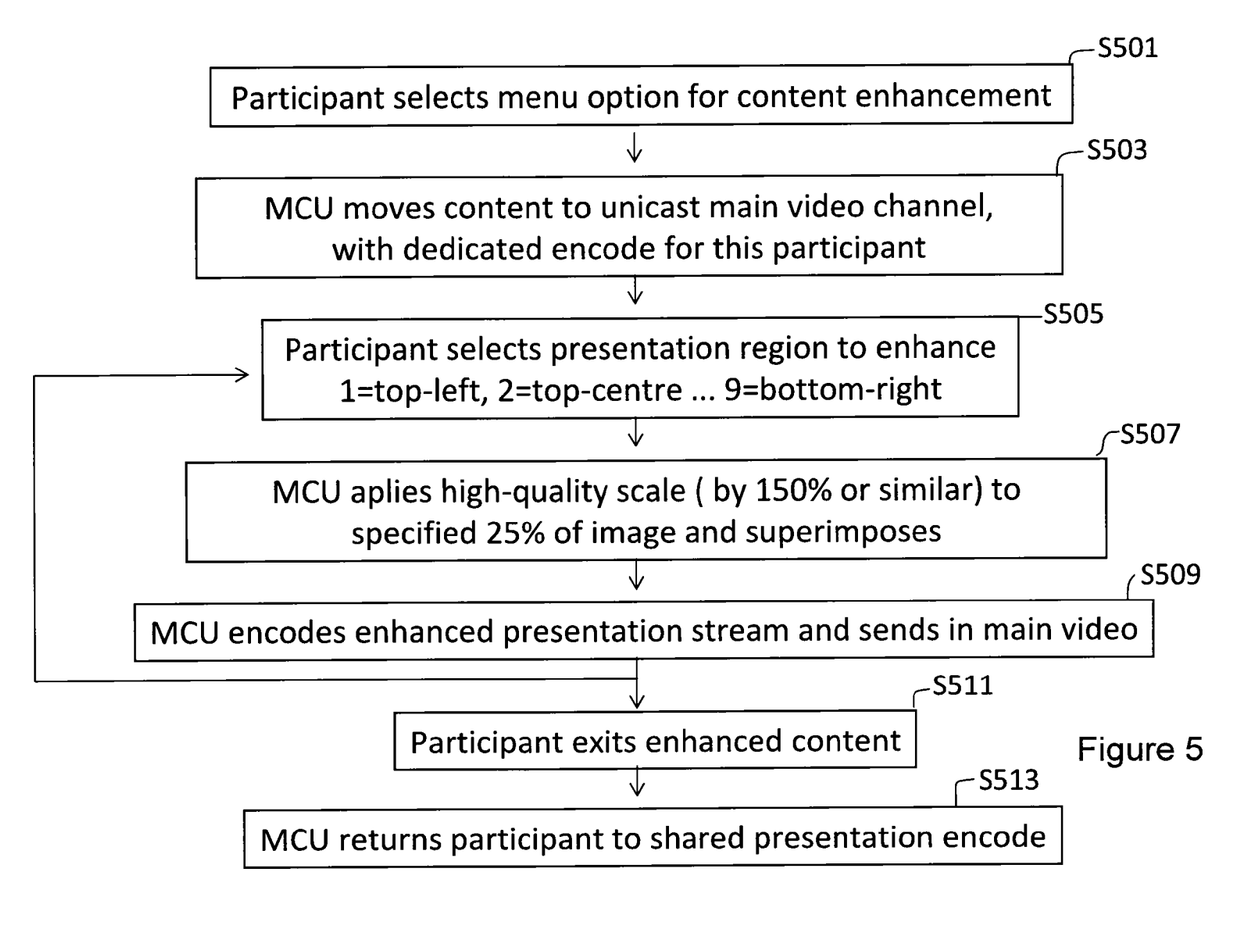
FIG. 5 is a flowchart of a process flow for providing user-defined content magnification of content to particular endpoints.

FIG. 5 is a flowchart describing a process flow for performing magnification of content to an endpoint. The process begins in step S501 where a participant (user) selects a menu option requesting content enhancement. In this step, the request may be interpreted as an electronic request to the MCU 500, requesting that the MCU prepare a video frame, with an upscaling of the content in the video frame to be transmitted directly to the requesting endpoint, consistent with a resolution and bandwidth supported by that endpoint.

Figure 6:
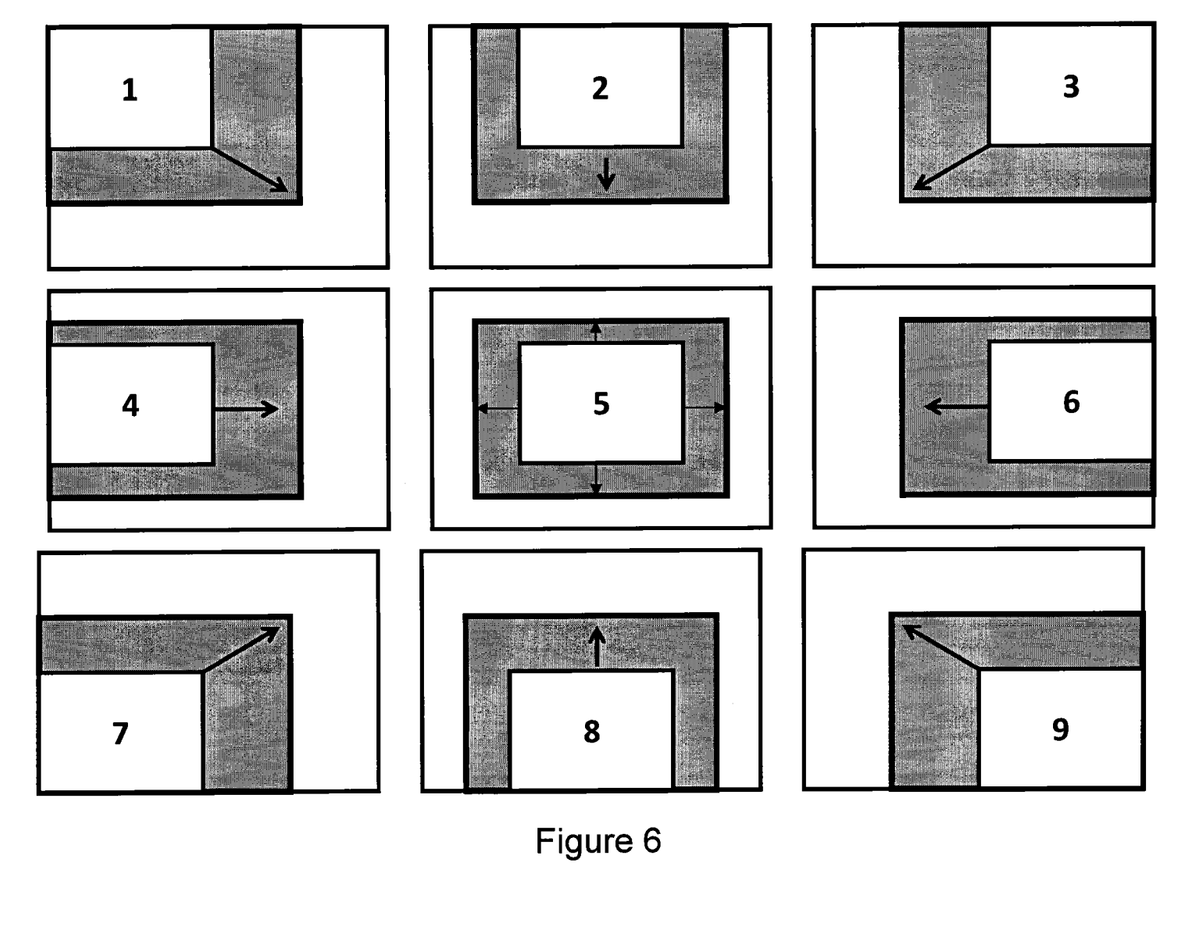
FIG. 6 is a diagram of user-selectable regions that are the subject of content magnification.

Subsequently the process proceeds to step S503 where the MCU moves content to unicast the main video channel with the dedicated encoding for the participant who had selected the content enhancement in step S501. The process then proceeds to step S505 where the participant selects the presentation region to enhance the image at the user's endpoint. As shown in the example of FIG. 6, the enhanced regions are listed 1 through 9, where each region is shown how the original image is magnified to a larger area. While nine candidate image areas are identified in FIG. 6, which is done to be commensurate with the DTMF messaging format for communications between the endpoint and the MCU, any number (discrete or analog) of magnification areas may be presented. For example, the user may use a pointing device to identify an area to be magnified as well as the size of the content area after magnification. This may be done through a dragging operation, or even through touch screen operation via a remote interface.

The process then proceeds to step S507 where the MCU applies a high quality scale (by for example 150%) to a specified 25% of the original image and superimposes the high quality scaled image onto the original image. The process then proceeds to step S509 where the MCU encodes the enhanced presentation stream into the main video stream and sends the combination of enhanced presentation and main video stream in a enhanced conference content channel to the endpoint. This process continues by looping back to step S505 until a response is received from the participant in step S511 where the participant chooses to exit the enhanced content mode of operation. Subsequently the process of step S513 directs the MCU to return the participant's video stream to a shared presentation encoding mode of operation. The process then ends.

Figure 7:
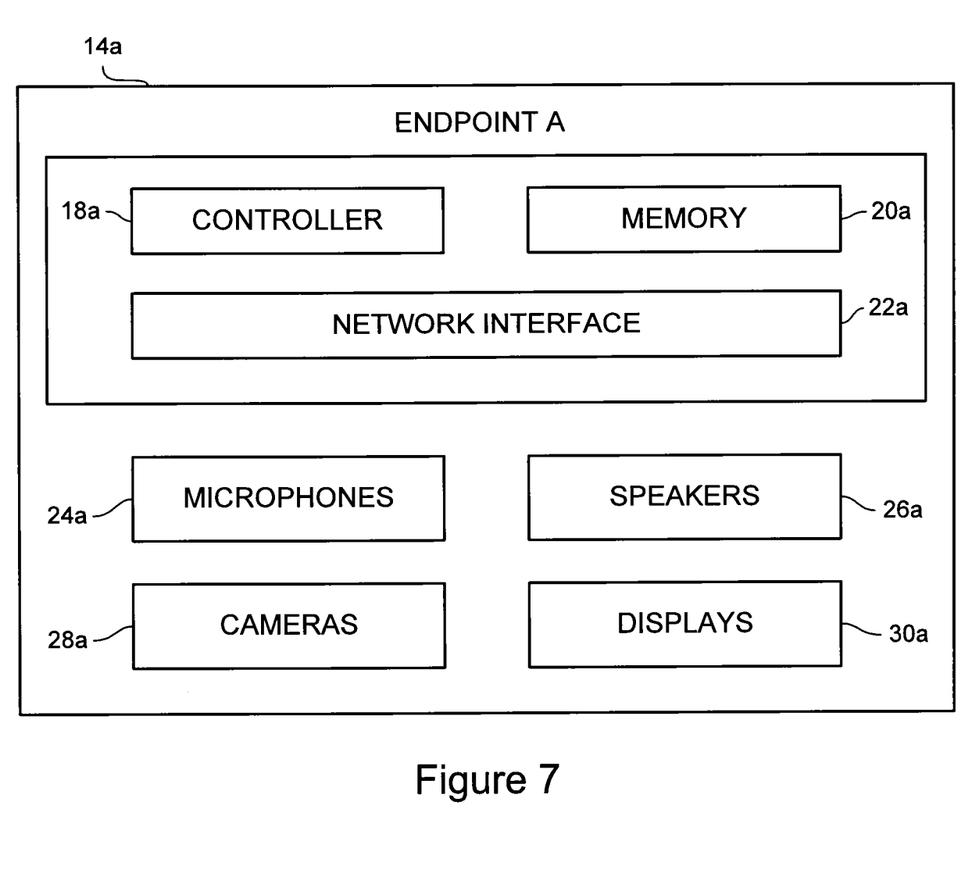
FIG. 7 is a block diagram of an exemplary endpoint according to an embodiment.

FIG. 7 illustrates components of a local endpoint A 14a. The local endpoint A 14a is used to concurrently display multiple video streams of another remote endpoint 14b-e (FIG. 1, for example). These video streams may each include images of the remote endpoint 14b-e as seen from different angles or perspectives. In some instances, positions at the local endpoints can be unoccupied or the camera angle may not be optimized for participants in occupied positions.

Endpoint 14a represents telecommunications equipment that supports participation in video conferences. In particular embodiments, endpoints 14a-e (FIG. 1) are deployed in conference rooms at geographically remote locations. Endpoints 14a-e may be used during a video conference to provide participants with a seamless video conferencing experience that aims to approximate a face-to-face meeting. Each endpoint 14a-e may be designed to transmit and receive any suitable number of audio and/or video streams conveying the sounds and/or images of participants at that endpoint 14a-e. Endpoints 14a-e may generate any suitable number of audio, video, and/or data streams and receive any suitable number of streams from other endpoints 14a-e participating in a video conference. Moreover, endpoints 14a-e may include any suitable components and devices to establish and facilitate a video conference using any suitable protocol techniques or methods. For example, Session Initiation Protocol (SIP) or H.323 may be used. Additionally, endpoints 14a-e may support and be inoperable with other video systems supporting other standards such as H.261, H.263, and/or H.264, as well as with pure audio telephony devices. As illustrated, endpoint 14a includes a controller 18, memory 20, network interface 22, microphones 24, speakers 26, cameras 28, and displays 30. Other endpoints 14 b-e include similar components. Also, while not illustrated, endpoints 14 may include any other suitable information processing equipment such as a computer that provides presentation content to the endpoint 14a, a speaker phone, a scanner for transmitting data, and a display for viewing transmitted data.

Controller 18 controls the operation and administration of endpoint 14a. Controller 18 may process information and signals received from other elements such as network interface 22, microphones 24, speakers 26, cameras 28, and displays 30. Controller 18 may include any suitable hardware, software, and/or logic. For example, controller 18 may be a programmable logic device, a microcontroller, a microprocessor, a processor, any suitable processing device, or any combination of the preceding. Memory 20 may store any data or logic used by controller 18 in providing video conference functionality. In some embodiments, memory 20 may store all, some, or no data received by elements within its corresponding endpoint 14a and data received from remote endpoints 14b-e. Memory 20 may include any form of volatile or non-volatile memory including, without limitation, magnetic media, optical media, random access memory (RAM), read-only memory (ROM), removable media, or any other suitable local or remote memory component. Network interface 22 may communicate information and signals to and receive information and signals from network 12. Network interface 22 represents any port or connection, real or virtual, including any suitable hardware and/or software that allow endpoint 14a to exchange information and signals with network 12, other endpoints 14b-e, videoconference manager and/or any other devices in a communications system.

Microphones 24 and speakers 26 generate and project audio streams during a video conference. Microphones 24 provide for audio input from users participating in the video conference. Microphones 24 may generate audio streams from received soundwaves. Speakers 26 may include any suitable hardware and/or software to facilitate receiving audio stream(s) and projecting the received audio stream(s) so that they can be heard by the local participants. For example, speakers 26 may include high-fidelity speakers. Endpoint 14a may contain any suitable number of microphones 24 and speakers 26, and they may each be associated with any suitable number of participants.

Cameras 28 and displays 30 generate and project video streams during a video conference. Cameras 28 may include any suitable hardware and/or software to facilitate capturing an image of one or more local participants and the surrounding area as well as sending the image to remote participants. Each video signal may be transmitted as a separate video stream (e.g., each camera 28 transmits its own video stream). In particular embodiments, cameras 28 capture and transmit the image of one or more users 30 as a high-definition video signal. Further it is contemplated that cameras are described herein are not limited to physical cameras. For instance, some teleconferencing systems can generate multiple viewpoints from locations where no camera physically resides. The field of computer graphics comprising image based rendering, as known to one of ordinary skill in the art, teaches the synthesis of new views through the manipulation of the data from a collection of (physical) cameras in other locations. Displays 30 may include any suitable hardware and/or software to facilitate receiving video stream (s) and displaying the received video streams to participants. For example, displays 30 may include a notebook PC, a wall mounted monitor, a floor mounted monitor, or a free standing monitor. In particular embodiments, one or more of displays 30 are plasma display devices or liquid crystal display devices. Endpoint 14a may contain any suitable number of cameras 28 and displays 30, and they may each be associated with any suitable number of local participants.

While each endpoint 14a-e is depicted as a single element containing a particular configuration and arrangement of modules, it should be noted that this is a logical depiction, and the constituent components and their functionality may be performed by any suitable number, type, and configuration of devices.

Figure 8:
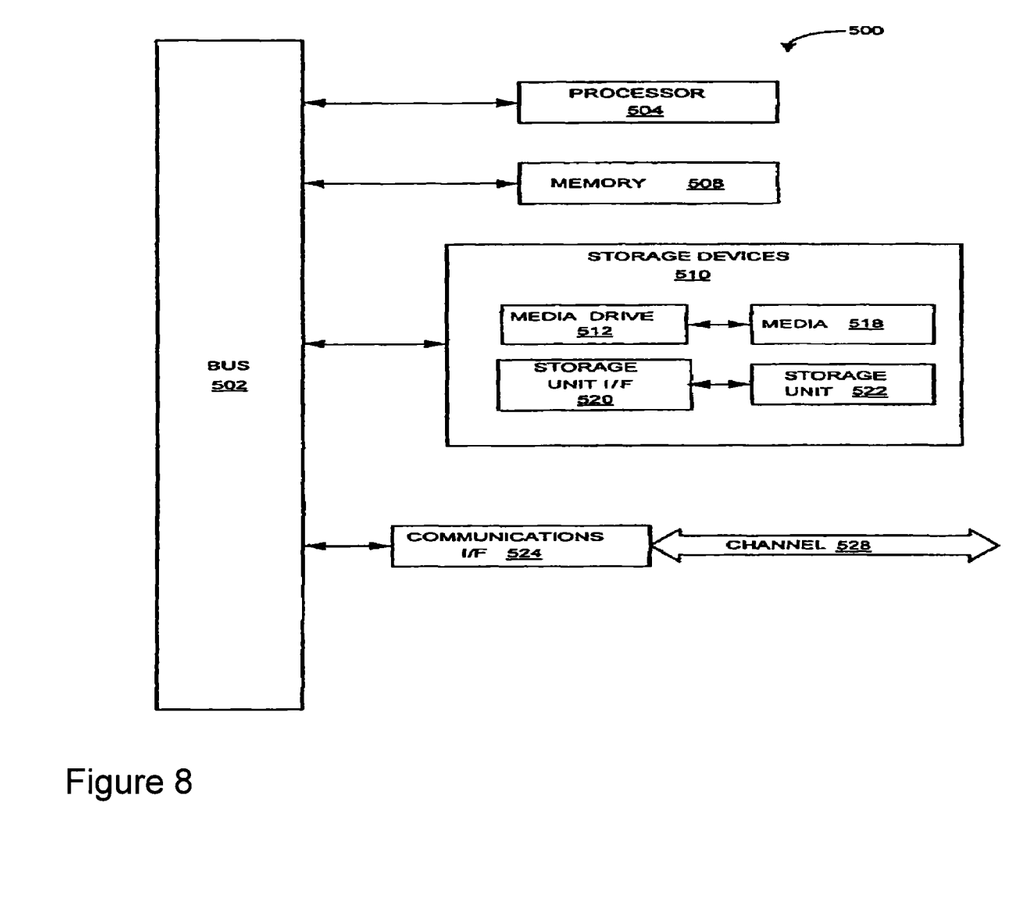
FIG. 8 is a block diagram of a transcoding MCU according to an embodiment.

FIG. 8 is a block diagram of main components of MCU 500. CISCO's MCU 4500 and MXE 5600 are non-limiting examples of commercial transcoding MCUs that, based on the teachings of the present disclosure, could be adapted to perform the magnification functions described herein. The MCU 500 includes one or more processors, such as a processor 504. Processor 504 can be implemented using a general or special purpose processing engine such as, for example, a microprocessor, microcontroller or other control logic. In this example, processor 504 is connected to a bus 502 or other communications medium. MCU 500 includes a main memory 508, such as random access memory (RAM) or other dynamic memory, for storing information and instructions to be executed by processor 504. Main memory 508 also may be used for storing temporary variables or other intermediate information during execution of instructions to be executed by processor 504. MCU 500 may likewise include a read only memory (ROM) or other static storage device coupled to bus 502 for storing static information and instructions for processor 504.

MCU 500 may also include information storage system 510, which may include, for example, a media drive 512 and a removable storage interface 520. The media drive 512 may include a drive or other mechanism to support fixed or removable storage media, such as a hard disk drive, a FLASH drive, an optical disk drive, a compact disk (CD) or digital versatile disk (DVD) drive (R or RW), or other removable or fixed media drive. Storage media 518, may include, for example, a hard disk, optical disk, CD or DVD, or other fixed or removable medium such as semiconductor memory that is read by and written to by media drive 514. As these examples illustrate, the storage media 518 may include a computer-readable storage medium having stored therein particular computer software or data.

In alternative embodiments, information storage system 510 may include other similar components for allowing computer programs or other instructions or data to be loaded into MCU 500. Such components may include, for example, a removable storage unit 522 and an interface 520, such as a program cartridge and cartridge interface, a removable memory (for example, a flash memory or other removable memory module) and memory slot, and other removable storage units 522 and interfaces 520 that allow software and data to be transferred from the removable storage unit 518 to MCU 500.

MCU 500 can also include a communications interface 524. Communications interface 524 can be used to allow software and data to be transferred between MCU 500 and external devices. Examples of communications interface 524 can include a modem, a network interface (such as an Ethernet or other network interface card (NIC)), a communications port (such as for example, a USB port), a PCMCIA slot and card, etc. Software and data transferred via communications interface 524 are in the form of signals which can be electronic, electromagnetic, optical or other signals capable of being received by communications interface 524. These signals are provided to communications interface 524 via a channel 528. This channel 528 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to non-transitory computer readable media such as, for example, memory 508, storage device 518, or storage unit 522. These and other forms of computer-readable media may store one or more instructions for use by processor 504, to cause the processor to perform specified operations. Such instructions, generally referred to as "computer program code" (which may be grouped in the form of computer programs or other groupings), when executed, enable the MCU 500 to perform functions of disclosed embodiments. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into MCU 500 using, for example, removable storage drive 514, drive 512 or communications interface 524. The control logic (in this example, software instructions or computer program code), when executed by the processor 504, causes the processor 504 to perform the functions of disclosed embodiments.

In a software context, the processor implements an application processor that is responsible for managing calls and video conferences. The application processor also manages the configuration of the media processing chains (audio, video, content) to implement what is needed to transcribed. So, the audio and video processing chains are configured by a media managing application that uses a fabric (one or more) of digital signal processing circuits that are interconnected to create and configure distributed media processing chains that span multiple processes. Especially when used in a multi-party videoconference, a fully transcoded continuous presence conferencing MCU functionality is employed (as opposed to a switched MCU) so that every participant is decoded and every participant receives a unique encoded media stream. A transcoding MCU renders images of the conference participants into one of a variety of different layouts. Typically the endpoint displays a grid of conference participants of a same size, or with certain conference participants in larger regions, while other participants are displayed on the side.

The MCU is communicated with from an endpoint via a top level menu and then it is numbered 0 to 9 where the numerical commands are sent using dual-tone multi-frequency signaling (DTMF) instead of an audio signal, so the control can be performed via a remote control device or a keypad. The user selects 0 to 9 and then navigates down through the menu to an option for content magnification. Once selected, the user is presented at the endpoint with a displayed menu of 0 to 9 which are mapped to sub-regions of the screen to be magnified (see FIG. 6).

Alternatively, a touch screen may be used for the user to point to the area to be magnified and then drag that area to a larger region of the display screen. As a further alternative, the endpoint's controller includes a fixed magnification factor (such as 150%) that allows the user to drag a magnification region around the screen and settle it over that portion the user wishes to have magnified. Because the endpoint coordinates the magnification operation with the MCU, in this embodiment, there will be a latency due to the round trip communication/processing delay in the network that would otherwise not be present in a local controller.

Obviously, numerous modifications and variations of the present invention are possible in light of the above teachings. It is therefore to be understood that within the scope of the appended claims, the invention may be practiced otherwise than as specifically described herein.

The invention claimed is:

1. A method comprising:
displaying presentation content as a presentation content portion of an image displayed at a videoconference endpoint, the presentation content including at least one of text and graphics;
sending an electronic request from the videoconference endpoint to a multi-point control unit, MCU, including data indicative of a selected region of the presentation content to increase a scale of the selected region of the presentation content portion of the image displayed at the videoconference endpoint;
changing an encoding of the presentation content at the MCU to increase the scale of the selected region of the presentation content portion of the image; and
sending an enhanced presentation stream that includes the presentation content portion and the selected region of the presentation content portion having an increased scale of the image to the videoconferencing endpoint.

2. The method of claim 1, wherein
the MCU is a transcoding MCU, and
the changing includes increasing a scale to over 100% for the presentation content portion and increasing the scale of the selected region in which the presentation content portion is displayed so as to have a magnifying effect on the presentation content portion that is displayed.

3. The method of claim 1, further comprising
receiving another electronic request from another videoconference endpoint; and
sending another enhanced presentation stream to the another videoconference endpoint in response to receiving the another electronic request.

4. The method of claim 1, wherein
the changing includes increasing the scale by a user-specified amount.

5. The method of claim 1, wherein
the changing includes increasing the scale by an amount specified in a pull down menu displayed at the videoconference endpoint.

6. The method of claim 1, wherein
the sending an electronic request includes sending a dual-tone multi-frequency (DTMF) signal to the MCU from the videoconferencing endpoint.

7. The method of claim 1, wherein
the changing includes mixing the enhanced presentation stream at the MCU into a main video stream.

8. The method of claim 1, wherein
the sending includes sending the enhanced presentation stream in a separate channel than a conference main video channel.

9. The method of claim 1, wherein
the changing includes overlaying the enhanced presentation stream over a portion of the image.

10. A system comprising:
an interface that
receives presentation content, and
receives, at a transcoding MCU, an electronic request from a videoconference endpoint to increase a scale of a selected region of a presentation content portion of an image displayed at a videoconference endpoint that sent the electronic request; and
a processor configured to
change an encoding process applied to the selected region of the presentation content so as to increase a scale of the selected region of the presentation content portion of the image, and send an enhanced presentation stream that includes the selected region of the presentation content portion having an increased scale of the image to the videoconferencing endpoint.

11. The system of claim 10, wherein
the processor and interface are disposed in the transcoding MCU, and
the processor is configured to change the encoding to increase a scale to over 100% for the selected region of the presentation content portion and increase the scale of the image in which the presentation content portion is displayed so as to have a magnifying effect on the selected region of the presentation content portion that is displayed.

12. The system of claim 10, wherein
the interface is configured to receive another electronic request from another videoconference endpoint; and send another enhanced presentation stream to the another videoconference endpoint in response to receiving the another electronic request.

13. The system of claim 10, wherein
the processor is configured to increase the scale of the selected region of the presentation content portion by a user-specified amount.

14. The system of claim 10, further comprising:
the videoconferencing endpoint, wherein
the processor is configured to change the scale by an amount specified in a pull down menu displayed at the videoconference endpoint.

15. The system of claim 14, wherein
the videoconference endpoint is configured to send the electronic request as a DTMF signal.

16. The system of claim 10, wherein
the processor is configured to mix the enhanced presentation stream into a main video stream.

17. The system of claim 10, wherein
the processor is configured to send the enhanced presentation stream in a separate channel than a conference main video channel.

18. The system of claim 10, wherein
the processor is configured to encode the presentation content to overlay the enhanced presentation stream over a portion of the image.

19. A non-transitory tangible computer readable medium encoded with logic for execution and when executed by a processor operable to:
    display presentation content as a presentation content portion of an image displayed at a videoconference endpoint, the presentation content including at least one of text and graphics;
    send an electronic request from the videoconference endpoint to a multi-point control unit, MCU, to increase a scale of a selected portion of the presentation content portion of the image displayed at the videoconference endpoint;
    change an encoding of the presentation content at the MCU to increase the scale of the selected portion of the presentation content portion of the image; and
    send an enhanced presentation stream that includes the presentation content portion having an increased scale of the selected portion of the presentation content portion of the image to the videoconferencing endpoint.

* * * * *